Figure 1:
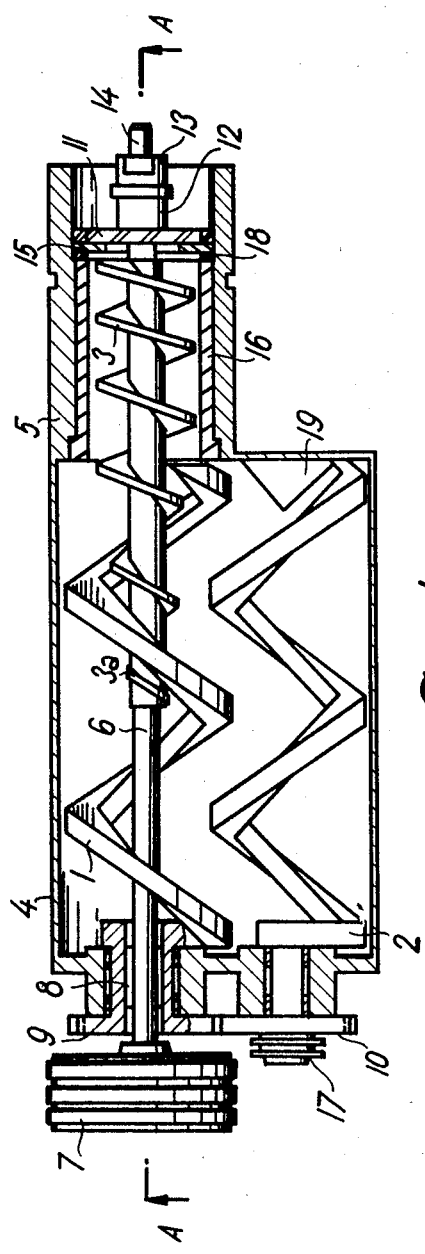

United States Patent

[11] 3,612,130

| [72] | Inventors | Pan Ponka<br>Cernosice;<br>Vaclav Pachovsky, Prague, both of Czechoslovakia |
|---|---|---|
| [21] | Appl. No. | 794,181 |
| [22] | Filed | Jan. 27, 1969 |
| [45] | Patented | Oct. 12, 1971 |
| [73] | Assignee | Chepos Zavody chemickeho a potravinarskeho strojirenstvi, oborovy podnik<br>Brno, Czechoslovakia |

[54] MEAT GRINDER
8 Claims, 2 Drawing Figs.

[52] U.S. Cl. .................................................. 146/181, 146/186, 259/6
[51] Int. Cl. ...................................................... B02c 18/30
[50] Field of Search .......................................... 146/181, 186, 187, 188, 189, 185; 259/6, 105, 21

[56] References Cited
UNITED STATES PATENTS

| 1,132,035 | 3/1915 | Rollman ...................... | 146/188 |
| 1,847,690 | 3/1932 | Hottmann ..................... | 146/181 X |
| 3,458,321 | 7/1969 | Reinhart et al. ............... | 259/6 X |

FOREIGN PATENTS

| 638,513 | 11/1936 | Germany ..................... | 146/181 |
| 223,293 | 9/1942 | Switzerland ................. | 146/181 |

Primary Examiner—William S. Lawson
Assistant Examiner—Z. R. Bilinsky
Attorney—Richard Low ABSTRACT: A meat grinder whose hopper is equipped with two Z-type kneading and mixing blades. One of these blades coaxially envelops an integral portion of the feed screw which projects from the cutter housing into the hopper and pushes meat from the hopper into the housing and to the cutters at the front end of the housing.

PATENTED OCT 12 1971 3,612,130

INVENTORS
Pan Poňka, Václav Pachovský
By Richard ——
Agt

MEAT GRINDER

This invention relates to mincing and grinding apparatus, and particularly to a grinder suitable for grinding meat.

Conventional meat grinders are equipped with a feed screw which extends from a hopper through the cutter housing to cooperating stationary and rotary cutters at the front end of the grinder. Additional screws have been provided heretofore to supply the feed screw with the meat chunks to be ground. The chunks of meat are sheared between the feed screw and the orifice of the cutter housing into smaller pieces, which are then further pushed through the cutter housing by the feed screw and ultimately minced or ground by the cutters.

Although substantial energy is expended on the preliminary shearing of the meat chunks, the pieces are still too big to permit the feed screw to be uniformly loaded. It must therefore be dimensioned for operation at relatively low efficiency. Furthermore, it is subjected to localized stresses at the orifice to the cutter housing which must be absorbed by the central spindle of the screw, thus making it necessary to make the spindle heavier than its average stressing would require.

The primary object of the invention is the provision of a system of screws or helical blades in a grinding apparatus of the type described which permits chunks to be more widely distributed over the feed screws, thereby making more space available for the material being fed to the cutters, and increasing the capacity of the grinder over similar devices of the prior art having corresponding weight and bulk.

With these objects and others in view, as will hereinafter become apparent, the invention provides a grinding apparatus of the general type described with a first blade or feed screw which is mounted on the shaft extending through the cutter housing and carrying one of the cutters. The first blade or feed screw extends in a helix about the axis of rotation of the shaft from the front end of the cutter housing and partly projects into the hopper from the rear of the housing. The projecting portion decreases in diameter in a direction away from the cutter housing.

A second blade which is of approximately helical shape about the aforementioned axis and envelops the rearwardly projecting part of the first blade or feed screw is mounted in the hopper for rotation about that axis. The drive of the grinding apparatus rotates the two blades about the common axis.

Figure 2:
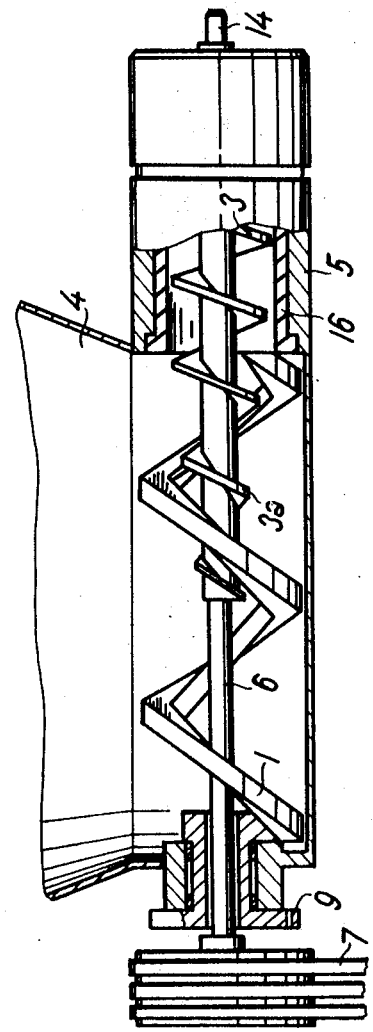

Other features and many of the attendant advantages of this invention will be better understood from the following detailed description of a preferred embodiment of the invention when considered in connection with the appended drawing in which:

FIG. 1 shows a meat grinder of the invention in plan section through the axis of its feed screw; and FIG. 2 illustrates the grinder of FIG. 1 in elevation and largely in section on the line A–A.

Referring now to the drawing in detail, there is seen a meat grinder whose stationary, fixed structure consists mainly of an upwardly open hopper 4 and a cutter housing 5 which is a horizontal cylindrical tube projecting forwardly from the hopper 4 near one side wall at the bottom of the latter.

The modified Z-type kneading blades 1, 2 which are of approximate helical shape are mounted in the hopper 4. The rear ends of the blades are fastened to respective short tubular shafts 8 journaled in the rear wall of the hopper. The ends sidewall shafts outside the hopper carry meshingly engaged spur gears 9, 10. The shaft 8 of the blade 2 also carries a drive sprocket 17 connected by a link chain to a nonillustrated stepdown transmission which normally rotates the blades 1, 2 about their respective parallel axes in opposite directions to drive meat in the hopper 4 downward between the blades.

The front ends of the blades 1, 2 are free. The front end of the blade 2 circles in close proximity to a conical guide and stripper 19 coaxially mounted on the front wall of the hopper 4.

A shaft 6 is coaxially received in the shaft 8 of the kneader blade 1 and extends through the hopper 4 and coaxially through the cutter housing 5. It carries a blade 3 having an approximately helical cutting edge and constituting the feed screw of the grinder. The front end of the helix is uniform in diameter, but the helix diameter decreases toward the rear end of the blade 3 from a point in the housing 5 inwardly spaced from the axial rear end of the housing by a fraction of the helix pitch at this point. Approximately one half of the blade 3 is received in the housing 5, and the other half 3a projects rearwardly from the housing into the hopper 4 where it is coaxially enveloped by the approximate helix of the kneader blade 1. The pitch of the blade 3 decreases continuously in a forward direction so that meat received between the turns of the blade is compressed as it is being fed forward.

The housing 5 is provided with a tubular liner 16 axially coextensive with the front part of the blade 3. Its inner face is corrugated in a conventional manner, not shown, for cooperation with the closely adjacent cutting edge of the blade 3. A retaining ring 18 separates the liner 16 from an internally toothed, normally fixed, annular cutting disc 15 which cooperates with a peripherally notched cutting disc 11 on the reduced, threaded front end 14 of the shaft 6. The discs are held in axially precisely defined position by a flanged bushing 12 which may be adjusted from the outside by means of a nut 13 on the shaft end 14 for the desired shearing cooperation of the discs 11, 15.

The rear end of the shaft 6 carries a V-belt pulley 7 normally linked with a similar pulley on the output shaft of a nonillustrated electric drive motor which is also directly coupled to the aforementioned stepdown transmission so that the rotary speed of the shaft 6 is much higher than that of the kneader blades 1, 2 during operation of the grinder.

When the blades 1, 2, 3 are rotated in the described manner, chunks of meat temporarily stored in the hopper 4 are bunched by the kneader blades 1, 2 at the rear orifice of the cutter housing 5 about the conically tapering rear portion 3a of the feed screw 3, and are compressed and fed forward in a continuous stream toward the discs 11, 15 by the screw 3. They are subjected to a preliminary cutting by the edge of the screw 3 partly in cooperation with the blades 1, 2 and partly with the liner 16 practically along the entire length of the screw 3.

The relative axial position of the discs 11, 15 is readily set by means of the nut 14 for effective grinding with the least possible temperature increase in the ground meat. The cutting discs 11, 15 are readily accessible and may be replaced by other types of shearing elements conventional in this art to produce a desired particle size and configuration in the ground meat.

The aforedescribed grinder is readily disassembled as far as necessary for cleaning. The pulley 7 is mounted on the shaft 6 for ready release in a conventional manner, not shown, and the shaft with the screw 3 may thereafter be withdrawn forward from the housing 5 after removal of the cutter discs 11, 15, thereby giving access to the liner 16. The kneader blades 1, 2 are readily accessible for cleaning through the hopper 4.

While a hopper 4 having a flat, horizontal bottom and two blades 1, 2 having axes in a common horizontal plane have been illustrated in the drawing, it will be appreciated that the hopper bottom may slope obliquely and have its lowest portion under the shaft 6, the axis of the blade 2 being offset upwardly from that of the blade 1 if so desired. In such a modified arrangement, gravity tends to enhance the meat-bunching effect of the blades 1, 2. Other modifications and variations of the illustrated embodiment of the invention will readily suggest themselves to those skilled in the art.

We claim:

1. In a grinding apparatus for meat and like material, the apparatus including a housing having an axis and being of substantially circular cross section, a shaft mounted for rotation about said axis, cooperating cutter members mounted on respective first axial end portions of said housing and of said shaft, hopper means for storing material to be ground, said hopper means communicating with the second axial end portion of said housing, and feeding means for feeding said material from said hopper means axially through said housing to said cutter members under pressure, the improvement in the feeding means which comprises:
   a. a first blade member mounted on said shaft for rotation therewith and extending substantially in a helix about said axis from said first end portion of said housing and partly projecting into said hopper means from said second end portion,
      1. the part of said first blade member projecting into said hopper means extending in a helix decreasing in diameter with respect to the cross section diameter of said housing in a direction away from said housing;
   b. a second blade member mounted in said hopper means for rotation about said axis,
      1. said second blade member being of approximately helical shape about said axis and enveloping at least one complete turn of said first blade member projecting into said hopper means; and
   c. drive means for rotating said blade members about said axis.

2. In an apparatus as set forth in claim 1, a part of said first blade member received in said housing extending in a helix of substantially uniform diameter, and said housing being substantially cylindrical.

3. In an apparatus as set forth in claim 1, a third blade member mounted in said hopper means for rotation about an axis substantially parallel to said first-mentioned axis, said third blade member being of approximately helical shape about the axis of rotation thereof and axially coextensive with said second blade member, said drive means being adapted to rotate said third blade member in unison with said second blade member.

4. In an apparatus as set forth in claim 3, a conical guide member fixedly mounted in said hopper means coaxially with said third blade member, one axial end portion of said third blade member being journaled in said hopper means and the other axial end portion being free to circle said guide member during rotation of said third blade member.

5. In an apparatus as set forth in claim 1, a hollow shaft journaled in said hopper means and coaxially receiving said first-mentioned shaft, said drive means including means for rotating said shafts at different respective speeds, and said second blade member being mounted on said hollow shaft.

6. In an apparatus as set forth in claim 1, said helix of said first blade member tapering substantially conically in an axial direction away from said first end portion of said shaft from a point in said housing spacedly adjacent said second end portion of the housing.

7. In an apparatus as set forth in claim 6, the spacing of said point from said second end portion being substantially smaller than the pitch of said helix at said point.

8. In apparatus according to claim 6, wherein the pitch of the helix of said first blade member increases as the thread of said helix extends in an axial direction from said first end portion of said shaft.